United States Patent
Gellert

[11] 4,074,704
[45] Feb. 21, 1978

[54] PROCESS OF AND APPARATUS FOR SOLAR HEATING AND THE LIKE

[76] Inventor: Donald P. Gellert, Box 37, R.F.D. 1, Plymouth, N.H. 03264

[21] Appl. No.: 691,092

[22] Filed: May 28, 1976

[51] Int. Cl.² .............................................. F24J 3/02
[52] U.S. Cl. .................................. 126/270; 126/271; 350/211
[58] Field of Search .............. 126/270, 271; 237/1 A; 350/211

[56] References Cited
U.S. PATENT DOCUMENTS

| | | | |
|---|---|---|---|
| 937,013 | 10/1909 | Severy | 126/271 |
| 3,982,527 | 9/1976 | Cheng et al. | 126/271 |

Primary Examiner—Kenneth W. Sprague
Attorney, Agent, or Firm—Rines and Rines, Shapiro and Shapiro

[57] ABSTRACT

This disclosure is concerned with the collection and concentration of solar ray energy and the like through optimal use of prismatic and reflective concentration thereof.

33 Claims, 9 Drawing Figures

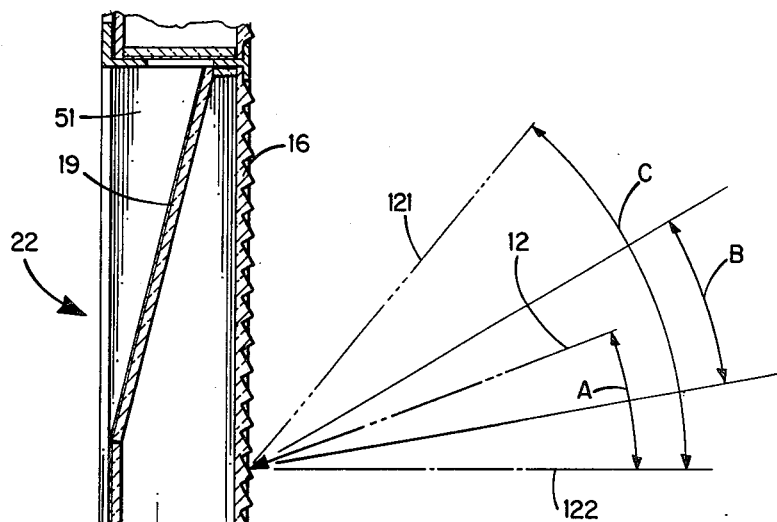
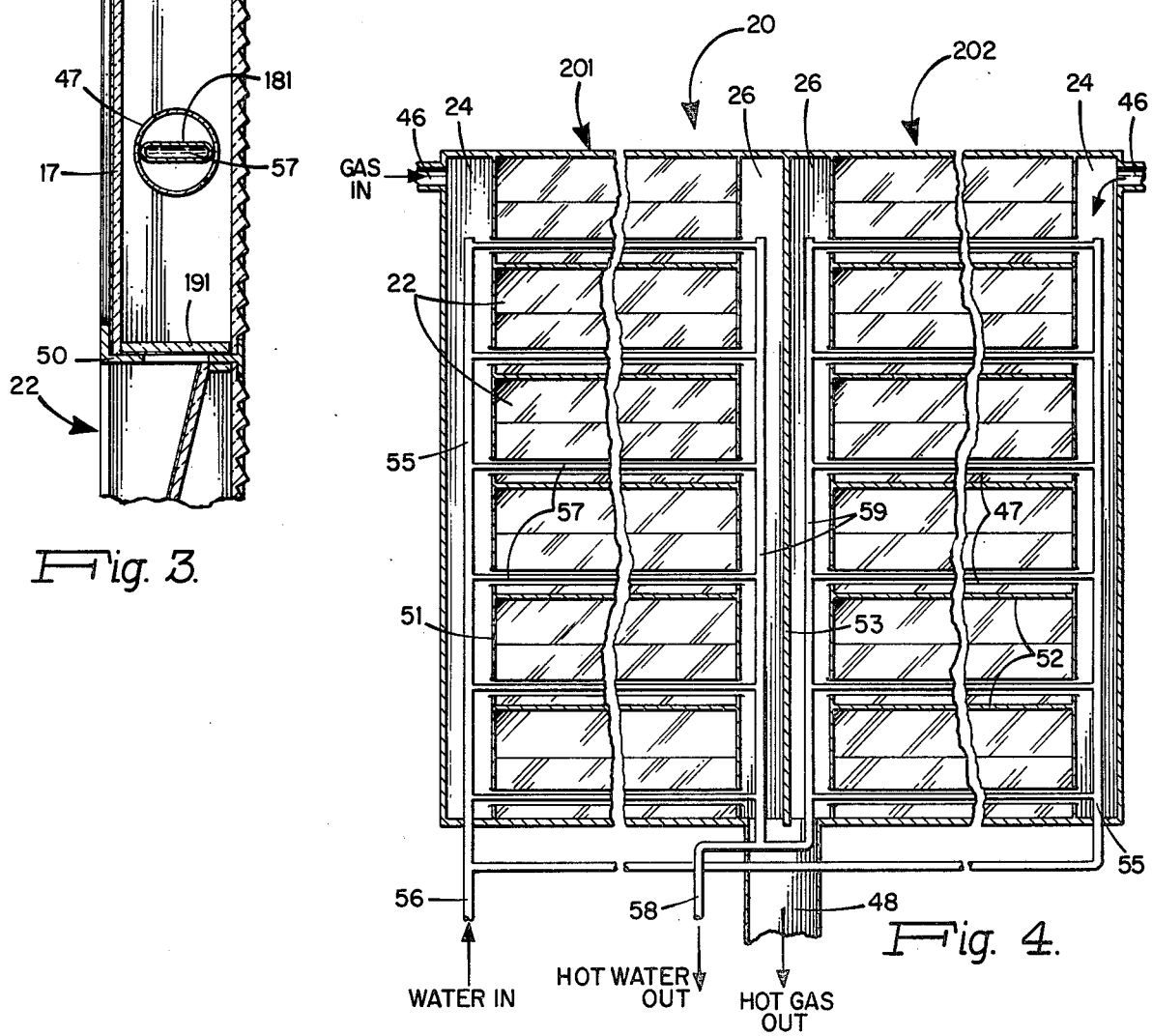
Fig. 3.
Fig. 4.

PROCESS OF AND APPARATUS FOR SOLAR HEATING AND THE LIKE

The present invention relates to processes or methods of and apparatus for solar heating and the like, being more particularly directed to improvements in the collection and concentration of solar and similar energy.

Man has long dreamed of harnessing solar energy for his effective utilization; and the art is replete with proposals for absorbing, storing and using the sun's rays, embodying many types of absorber systems. Among the early United States Letters Patent bearing upon such schemes are the following: Severy - U.S. Pat. No. 496,959; Paine - U.S. Pat. No. 509,392; Davis - U.S. Pat. No. 629,122; Walker - U.S. Pat. No. 705,167; Cunniff - U.S. Pat. No. 819,342; Severy - U.S. Pat. No. 937,013; Rountree - U.S. Pat. No. 1,003,514; Trosper - U.S. Pat. No. 1,325,596; Vinson - U.S. Pat. No. 1,673,429; Cline - U.S. Pat. No. 2,202,756; and Modine - U.S. Pat. No. 2,274,492. These proposals involve variations in absorber materials and constructions, liquid and other transfer assemblies, gear-driven mechanisms for tracking the sun's position, and related concepts that, while theoretically operative, were too complex, costly or specialized to permit of general commercial use.

Other attempts to utilize solar energy were directed towards improvement in solar radiation concentration by reflection and optical magnification, primarily involving reflectors and lenses and combinations of the same as described, for example, in the following United States Letters Patent: Wideen - U.S. Pat. No. 683,088; Himalaya - U.S. Pat. No. 797,891; Harris - U.S. Pat. No. 2,625,930; Von Brudersdorff - U.S. Pat. No. 2,859,745; Cotton et al - U.S. Pat. No. 2,987,961; Macauley - U.S. Pat. No. 3,085,565; Hunt - U.S. Pat. No. 3,118,437; Falbel - U.S. Pat. No. 3,179,105; Lessley - U.S. Pat. No. 3,229,579; Mertz - U.S. Pat. No. 3,469,902; Trombe (French) - U.S. Pat. No 1,165,672; Popoff (German) - U.S. Pat. No. 394,232; and Baulino (Italian) - U.S. Pat. No. 370,365. The cost, complexity and space requirements of such constructions, and the various degrees of inefficiency and impracticability there-involved have also prohibited the use of such reflector and/or lens systems for general use.

More recent proposals in the use of lenses, including Fresnel lenses, and reflectors have provided techniques for concentrating solar energy to a level of high heat intensity; as described in United States Letters Patent of Sleeper - U.S. Pat. No. 3,125,091; Drescher - U.S. Pat. No. 3,171,403; Culling - U.S. Pat. No. 3,182,654; Dickinson - U.S. Pat. No. 3,407,122; Weiner U.S. Pat. No. 3,467,840. While heat concentration at temperatures of thousands of degrees has been claimed, and while at the present state of the art, it is possible to track the sun for the direct utilization of its energy, to concentrate the energy to high intensity, and to transfer and store the same, such systems unfortunately involve expense and complexity that keep them well out of the reach of the general public for its home and related needs. It is, indeed, to the solution of the problem of utilizing solar energy for practical private home and office use and the like that the present invention is particularly directed.

Underlying the invention is the discovery of highly effective solar concentration through a novel compound of prismatic magnification and reflection with optimum geometric placement. While prisms are well-known devices, they have not heretofore been used in the critical prismatic magnification and solar concentration manner underlying the techniques of the invention, but rather have had other refraction uses of the type described, for example, in the following patents: Basquin - U.S. Pat. No. 586,211; Mygatt - U.S. Pat. No. 821,310; Guth - U.S. Pat. No. 1,294,900; Rolph - U.S. Pat. No. 2,015,235; Merton - U.S. Pat. No. 2,248,638; and Eibon - U.S. Pat. No. 2,558,373.

A principal object of this invention, accordingly, is to provide a new and improved process or method of and apparatus for solar heating and the like, particularly involving maximally concentrating the sun's rays through level prismatic and reflection concentration, that obviate the above-mentioned disadvantages of prior art proposals and provide a relatively inexpensive, universal construction that, additionally, eliminates the need for movable tracking systems, where not desired or not feasible.

Another object of this invention is to provide a novel solar collector and system that is simple in construction, and can be installed and maintained in the home or similar area without highly skilled installers.

In summary, from one of its important aspects, the invention embraces a process of collecting solar energy by impinging the radiation upon a plurality of successive radiation-transmitting surfaces each oriented at an acute angle to an adjacent plane; refracting the radiation so impinged upon each surface in the regions between the same and the adjacent plane; directing the refracted radiation upon a collecting surface located at a predetermined region behind said plane; adjusting the said acute angle of orientation with reference to the refraction index in said regions and within limits such that the refracted radiation is effectively concentrated to provide greater energy per collecting surface area than the radiation energy per unit area upon the first named surfaces, thereby amplifying the energy at the collecting surface; and absorbing the energy at the collecting surface. Preferred details and constructional features are hereinafter set forth.

The invention will now be described with reference to the accompanying drawings FIG. 1 of which is a combined isometric and block diagram of a solar heating system embodying the invention;

Figure 2A:
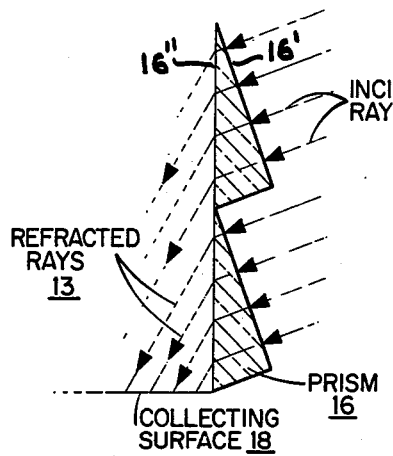
FIG. 2A is an enlarged fragmentary section of FIG. 2B.
Figure 2B:
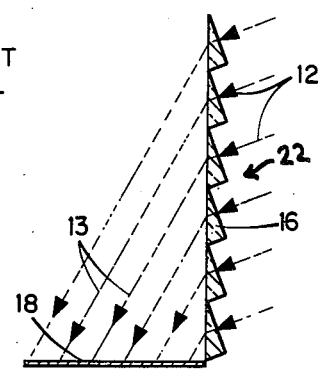
FIG. 2B is a cross-sectional view of a preferred prismatic concentrating array for use in the system of FIG. 1.
Figure 2C:
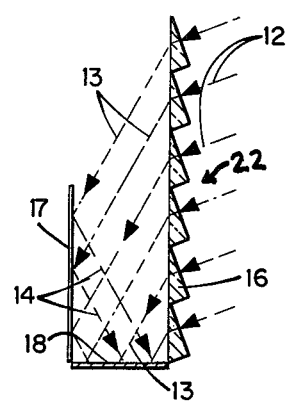
Figure 2D:
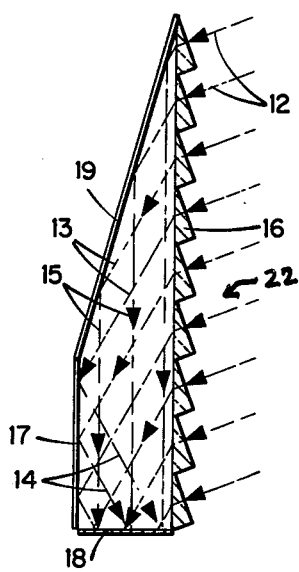
Figure 2E:
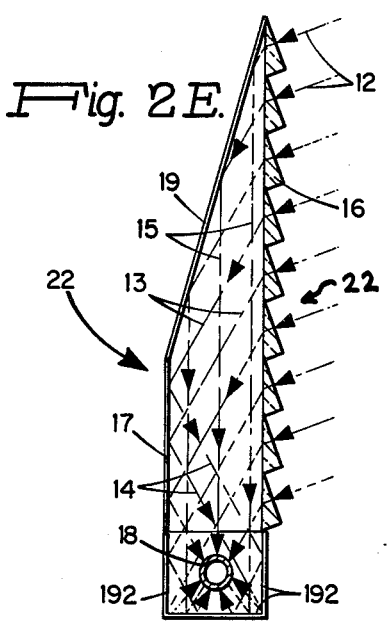
Figure 2F:
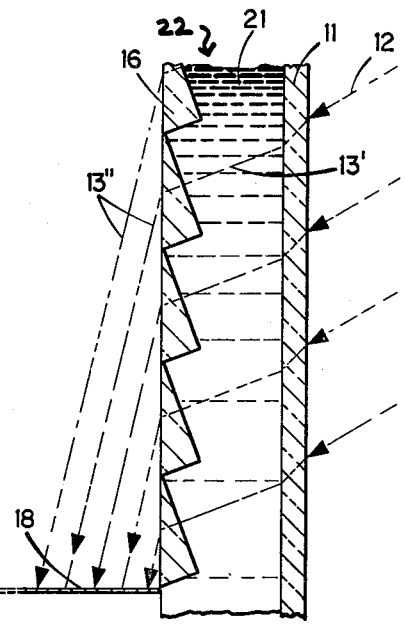

FIG. 2C – F are similar views of modified collector constructions employing arrays similar to FIG. 2A and B;

FIG. 3 is a view similar to FIG. 2E, illustrating several stacked arrays in an installation and showing angular coverage; and FIG. 4 is a front elevation view of a two-dimensional system of vertically and horizontally stacked and interconnected prismatic collector array systems.

Figure 1:
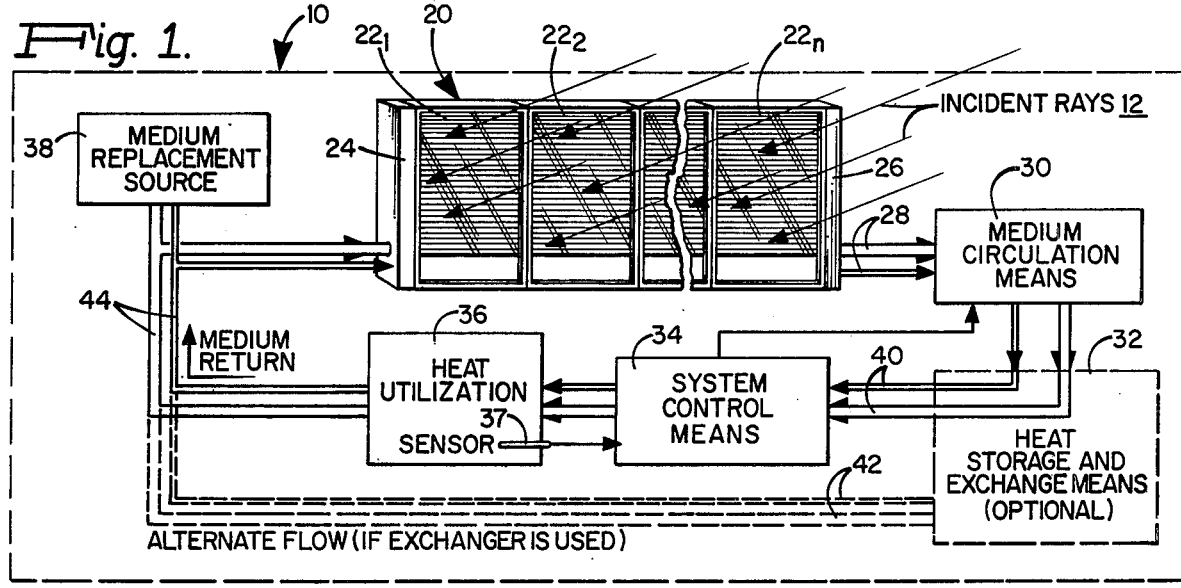

Referring to the overall system 10 of FIG. 1, the total solar collector is designated at 20, comprising individual collector arrays 22, numbered $22_1$, $22_2$ ... $22_n$. The incident solar (or similar) rays 12 enter the collectors 22, the details of which are later discussed, resulting in concentrating the rays at an internal collecting surface as hereinafter explained, and enabling heating of a liquid or other medium circulated in pipes, conduits or lines 28 emerging from the right-hand end 26 of the collector system 20 in rather conventional fashion, under the action of a pump or other circulating means 30. The circulator 30 may be controlled by a conventional system monitor control 34 responsive to a heat sensor 37 associated with a utilization system generally indicated at 36. The circulator 30 may also communicate by lines 40 with conventional heat storage and exchange means 32, if used, with alternate flow paths 42 employed in the event of such heat exchange, as is well known. A source of fluid or other medium replacement 36 may be coupled to the medium return lines 44 entering the left-hand end 24 of the collector system 20. Clearly, other well-known circulation systems may also be employed, the invention being concerned with the novel solar collection and concentration technique and apparatus and not the particular circulation or utilization system associated therewith.

Turning to that novel collection and concentrating technique and apparatus, the forms of collector arrays 22 illustrated in FIGS. 2A–F and FIGS. 3 and 4 operate upon the preferred principle of substantially vertically oriented, flat-plate, concentrating non-tracking low-cost-material arrays or pluralities of small-angled parallel prisms 16. The vertical or near vertical orientation minimizes umbrageous, collection-nullifying effects of foreign matter accumulation. The flat-plate concentrating array has the advantages of easily generated and architecturally useful surfaces with minimization of insulative areas. As shown in FIGS. 2A and B, incident rays 12 of the sun impinge upon the protruding staggered front surfaces 16' (FIG. 2A) of the successively vertically stacked small angle prisms 16, with the front surfaces 16' critically oriented forward at an acute angle with respect to the vertical plane, as later more fully delineated. The rays are transmitted through the front surfaces 16' of each of the prisms 16 and are similarly refracted by the similar prisms as they respectively pass through the region of each prism, emerging as refracted rays 13 at the vertical rear surfaces 16" of the prisms 16. By appropriate selection or adjustment of the acute angle orientation of the front prism surfaces, 16', the included acute angle of the prisms and the refractive index of the material thereof, the refracted rays 13 can be caused to be concentrated closer together than the incident rays 12, as shown, providing greater energy per collecting surface area at 18 than the radiation energy per unit area upon the front prisms surfaces 16', thereby amplifying the energy at the collecting surface 18, which may be a "black body" absorbing surface. Though later discussed in detail, appropriate selection of prism refractive index and acute angle may result, for example, in doubling the energy concentration at a surface 18, of horizontal width about half the height of the prism array.

Through the use of this concentrating action on incident radiation by such small-angle prisms, therefore, inexpensive but highly effective collector arrays 22 may be constructed embodying one or two dimensional arrays or other geometrical configurations, such as annular arrays, or sets of arrays as more particularly shown, for example, in FIGS. 1, 3 and 4, with the basic building block a simple, thin, transparent vertical sheet of stacked parallel prisms 16, say of the order of 25 mils in thickness.

By employing a taller array of prisms 16, a reflector 17 may be used rearward of the array, FIG. 2C, and extending upward from surface 18 at a position such as to intercept the concentrated refracted rays 13 and reflect them at 14 upon the surface 18. With an array of doubled height, such energy concentration may be thus increased by another approximate factor of two.

If, moreover, a second reflector 19 is added, inclining upward at half the angle of refraction to direct the refracted rays 13 incident thereupon downward at 15 upon the collecting surface 18, as shown in FIG. 2D, the array height can be further increased with corresponding proportional increase in concentration at the absorber collecting plane or surface 18. Clearly curved as well as planar reflectors may be used, including reflectors of parabolic contour.

The system of FIG. 2D is indeed employed in the embodiment of FIG. 2E wherein the concentrating surface 18 is shown in the practical form of a fluid-carrying tube serving as a black body absorber and contained in a channel of Fresnel concentrating reflectors 192 which further focus the downwardly refracted and reflected-refracted rays with higher concentration of heat than with the narrow planar absorber surfaces 18 of FIGS. 2A–D.

The embodiments of FIGS. 3 and 4 illustrate practical modular construction embodiments 22 of the system of FIG. 2D with the absorber 18 shown at 181 as a tubular element 57 enclosed in a Pyrex enclosure 47, and with the unit having a base 191. In FIG. 4, the system 20 is shown embodying a pair of collector assemblies 201 and 202 of vertically stacked units of the type described in connection with FIGS. 2E and 3, for example, and adapted for the heating of both gas and water. Gas enters through inlet 46 and exits at 48, being heated while in manifolds 24 and 26 from the radiation collimated by individual collector arrays 22. The water entering at water valve 56 passes through water jackets in manifold 55, through transfer tubes 57 and water jackets in manifold 59, exiting at valve 58.

If desired, moreover, additionally to enhance performance, an auxiliary chamber 11–21 may be used forward of the prism array 16 filled, for example, with transparent media such as liquids of appropriate refraction indices (to effect a desired incidence 13' and ultimate refraction 13") thus to yield a reasonably efficient static system that requires neither daily nor seasonal adjustment to accommodate for solar movements. The medium 21 may also comprise other optionally refractive materials such as prisms that could receive rays 12 from widely different angles including, for example, normal to the surface, and would refract the same to provide the incidence 13' required by the array of prisms 16.

The wide diversity of application and modification thus feasible with the present invention permits it to be retrofitted to existing walls or built into new constructions; enables diffused light to pass while concentrating direct rays; is installable by unskilled hands though involving a high technology assembly that can produce sufficiently high temperatures to service even numerous industrial packaged boiler applications. Apart from high technology applications involving a prismatic array of glass, the materials for prism construction can be selected from among the following mass-produced and inexpensive materials: acrylics, such as acrylic polyester, poly carbonates, vinyls, cellulosics and eopxy cast resins. Thermoplastic sheets extrusion-molded by diamond machined aluminum rolls, appropriately plated with nickel or chrome, may be readily fabricated, as may other engraved, cast or machined arrays.

It has been found that, for a material of given optical properties, there is a single unique "most efficient" prismatic angle for collecting incident solar energy throughout a heating season, without re-orientation of the collector array. Otherwise stated, the appropriate selection of prism refractive index and prismatic angle can define the system's "operating window". The prisms have been shown preferably having a substantially right angle at the forwardly protruding vertex, and an angle at the top vertex which is included between the front surface 16" and the vertical, and is hereinafter referenced as the prism or prismatic acute angle. The prism angle in FIGS. 2A–E is equal to the angle A between the incident rays 12, normal to the front prism surface 16', and the horizontal 122, FIG. 3.

An increase in the prism material refractive index at any given prismatic angle will increase the collector concentration, but decrease the "operating window"; the converse being also true. Reducing the prismatic angle for a material of given refractive index, moreover, will reduce collector concentration, while extending the "operating window". These two parameters should be optimized for the selected cost effective material and application.

For a prism material of about 1.5 refraction index, a prismatic angle of about 33.5° was selected for operation in tests later discussed; though successful parametric analyses have been made for refraction indices in the range of from about 1.5 to about 1.58 and associated prism angles in the range of from about 27° to about 36°.

Studies have been carried out with a system of the type shown in the embodiment of FIG. 3 with a cast acrylic polyester prismatic array 16 of prism refractive index 1.50 and with an angle of 17° between reflector 19 and the vertical plane, and having the following structure and characteristics:

Prismatic angle - 33.5° (erected vertically with the collecting surface at a 56.5° tilt angle)
Prismatic density - 4.333 per inch of collector concentrator height
Concentrating mirrors - first surface Mylar
Absorber (at 18) - elliptical water-filled copper calorimeter (Ebanol-C)
Vertical collecting area - 345 sq. in. (30 in. height × 11.5 in. width)
Effective prismatic collecting area - 2 sq. ft.
Absorber area - 48 sq. in.
Concentration factor, normal ray - 6
Thermally insulated surfaces - none required.

Tests were conducted in New Hampshire at latitude 43° N, longitude 71° W over the winter months. Collection or thermal efficiencies of the order of 63% were obtained. Studies demonstrated that the highest efficiencies appear to occur at the mid-winter inclination of about 28.5°. These efficiencies change little through an inclination of the sun's rays to 33.5° above the horizon, and they then fall off radically as the sun's inclination rises further above the horizon (angles between B and C, for example, FIG. 3, indicated between ray 121 and the horizontal 122).

In effect, therefore, such increased angles of inclination and azimuth would effectively shut off the system automatically in the spring; and this can be controlled as to approximate date by the latitude of the installation and the values of prismatic angle and material index. The system would also then automatically turn on in the fall as the angles of inclination and azimuth reduced again to appropriate ranges. Such turn-off or turn-on may, of course, be altered by deliberate angular readjustment or tilting of the array, as desired, and such could readily be automatically effected by any well-known photoelectric-controlled servo mechanism mounted on the frame 20 (though not shown in FIGS. 1 and 4); or, if more elaborate and expensive systems were desired, azimuth and/or altitude well-known tracking mechanisms could also be employed. Thus the system of the invention need not be strictly vertically oriented in all instances, but may be inclined, as well; such that reference to the vertical and horizontal orientation herein are to be deemed as references to relative axes or orientations and are generic terms.

Losses encountered with the process and apparatus of the invention by an incident ray include the following:

(1) Reflection loss as the ray 12 enters the front surface 16' of the prism 16 — 4% when the ray 12 is normal to the surface 16'. The average is about 6% for heating season solar azimuths.

(2) Internal reflection loss at refracting surface 16" — from 4% to 100% depending upon refraction angle. About 9.5% average over the coldest portion of the heating season in the above examples.

(3) Front surface mirror absorption loss — 2%.

(4) Total reflection from inner and outer surfaces of collector tube 47, FIG. 3 — 6%.

(5) Absorption at 18 (181, FIG. 3) — 96% (4% loss). As the summer solistice is approached, the angles of azimuth at dawn and dusk become so large that no light is accepted by a south-oriented collector in the illustrative installations previously discussed. Additionally, as the angle of inclination increases beyond the point at which the reflection at the internal refracting surface (item (2), above) is 100%, no light is transmitted and the system 20 becomes a visible light radiation shield.

The maximum effective collecting area presented normal to the sun by a 600 square foot 33.5 degree prismatic array 22 of the invention (say about 100 prisms to the inch) is about 500 square feet. The average normal flux on a clear December day at 43° N latitude, is 230 BTU/hour-ft.$^2$, and it persists for 9 hours. This average flux, corrected for azimuthal projection on the vertical, south-facing collector, reduces to an effective average 193 BTU/hour-ft$^2$. At a collection efficiency of 63.5%, the system can thus be expected to collect and transfer to the absorber coolant a total of 551,497 BTU/day, or 13,787 BTU/day/module 22. Series-paralleling of the individual modules 22 may be arranged so that easily attained coolant flow (say water, as in FIGS. 1 and 4), for each module of approximately 1 gpm is provided, with a temperature rise of about 40° F. per module.

While the above is but illustrative of operational examples of the invention, it will clearly be understood that further modifications and variations in construction and operation will suggest themselves to those skilled in this art, such being embraced within the spirit and scope of the appended claims. In summary, however, among the most salient features or characteristics of the invention are its novel and critical combined prismatic concentration and reflective mirror concentration; similar space requirements to those for conventional flat-plate collectors of comparable capacity for total incident light collection, and far less than for other concentrating collector systems of comparable collection capacity; adaptability for wall and other mounting and tilting mechanisms, if desired, to avoid automatic cut-off in non-heating season as before discussed; simplicity of construction with absorber, collector and reflectors assembled in rigid parallelogram relationship, and void of focusing and adjustment problems; multiple-purpose architectural uses including substituting for an opaque mirror and admitting ambient diffused light to a building interior while concentrating direct rays; and use of mass-production materials and techniques.

What is claimed is:

1. A process of concentrating radiation that comprises: impinging the radiation upon a plurality of successive staggered front surfaces of an array of prisms, each front surface being oriented at an acute angle to an adjacent plane extending along the length of the array at a rear surface of each prism; passing the radiation so impinged upon said front surfaces through the prisms and refracting the radiation at the rear surfaces of the prisms; directing the refracted radiation upon a collecting surface located at a predetermined region behind said plane; adjusting the said acute angle of orientation with reference to the refraction index of the prisms and within limits such that the refracted radiation is effectively concentrated to provide greater energy per collecting surface area than the radiation energy per unit area impinged upon the first-named surfaces, thereby amplifying the energy at the collecting surface; and absorbing the energy at the collecting surface.

2. A process as claimed in claim 1 and in which the radiation is solar radiation and the like, and the step of adjusting the said acute angle of orientation and said refraction index is effected with reference to the latitude of operation with its range of solar ray incidence and azimuthal angles, in order to predetermine the annual periods of effective concentrating.

3. A process as claimed in claim 2 and in which the said plane is oriented substantially vertically.

4. A process as claimed in claim 2 and in which said front surfaces are tilted to adjust the angles of impinging of the radiation.

5. A process as claimed in claim 1 and in which said directing step comprises reflecting at least some of the refracted radiation generally towards said collecting surface.

6. A process as claimed in claim 1 and in which said directing step comprises reflecting at least some of the refracted radiation generally downward towards said collecting surface.

7. A process as claimed in claim 1 and in which said directing step comprising reflecting some of the refracted radiation from each of differently oriented reflecting surfaces generally toward said collecting surface.

8. A process as claimed in claim 1 and in which said directing step comprises reflecting at least some of the refracted radiation generally upward towards said collecting surface.

9. A process as claimed in claim 1 and in which said directing step comprises reflecting at least some of the refracted radiation generally in a direction substantially parallel to said plane towards said collecting surface.

10. A process as claimed in claim 1 and in which the energy absorbed at the collecting surface is thereupon transferred to a utilization location.

11. A process as claimed in claim 1 and in which said acute angle and said refraction index are substantially within ranges of from about 27° to 36° and 1.50 to 1.58, respectively.

12. A process as claimed in claim 1 and in which said front surfaces are parallely mounted in a substantially planar array extending along the direction of said plane.

13. A process as claimed in claim 12 and in which front bottom of said surfaces protrude outward from said plane.

14. A process as claimed in claim 12 and in which said concentrating is effected by placing a plurality of said arrays over an area subjected to said impinging radiation.

15. A process as claimed in claim 1 and in which the angle of impinging of the radiation upon said front surfaces is adjusted by optically directing the same upon said front surfaces.

16. A process as claimed in claim 15 and in which the optical directing is effected by refraction in front of said front surfaces.

17. Radiation-concentrating apparatus having, in combination, a substantially planar array of substantially parallelly mounted prisms extending along a predetermined plane at the rear surfaces of the prisms with successive staggered front prism surfaces exposed to impinging radiation; energy-absorbing means comprising a collecting surface disposed rearward of said plane; said prisms being selected with an acute included angle between said rear and front surfaces and a refractive index such as to concentrate the radiation impinged upon the front prism surfaces into a smaller area, after refraction at the rear surfaces of said prisms, upon the energy-absorbing means, thereby to amplify the energy from the radiation at said collecting surface; and means for utilizing the energy thus concentrated.

18. Radiation-concentrating apparatus as claimed in claim 17 and in which said plane is substantially vertical.

19. Radiation-concentrating apparatus as claimed in claim 17 and in which said acute angle and refractive index lie within ranges of from about 27° to 36° and 1.50 to 1.58, respectively.

20. Radiation-concentrating apparatus as claimed in claim 17 and in which the lower edge of each of said surfaces protrudes outward from said front plane.

21. Radiation-concentrating apparatus as claimed in claim 17 and in which optical means is disposed rearward of said plane to direct at least some of the refracted radiation towards said collecting surface.

22. Radiation-concentrating apparatus as claimed in claim 21 and in which said optical means comprises reflecting means.

23. Radiation-concentrating apparatus as claimed in claim 22 and in which said reflecting means comprises a plurality of differently oriented reflectors.

24. Radiation-concentrating apparatus as claimed in claim 22 and in which said collecting surface is near the bottom of said array.

25. Radiation-concentrating apparatus as claimed in claim 21 and in which said array is stacked with one or more additional similar arrays to provide a collecting area, and the energy-absorbing means of each array are cooperatively interconnected.

26. Radiation-concentrating apparatus as claimed in claim 17 and in which radiation-directing means is provided in front of said array to control the angle of incidence of the impinging radiation upon said front prism surfaces.

27. Radiation-concentrating apparatus as claimed in claim 26 and in which said radiation-directing means comprises further refractive means.

28. A solar energy collector extending generally upwardly from a solar energy absorption region and having means for concentrating the sun's rays at said absorption region, said means comprising a transparent prismatic front wall having prisms arranged successively in a stacked array, each prism having an acute included angle at an upper end between a rear surface of the prism that extends along the length of the array and a front surface of the prism that extends downwardly and outwardly from the rear surface so as to be exposed to the sun's rays, the included angles and the refractive indices of said prisms being such that the sun's rays impinging upon the front surfaces of said prisms substantially perpendicularly thereto are refracted downwardly by said prisms.

29. A solar energy collector according to claim 28 and in which said front surfaces of said prisms are substantially parallel.

30. A solar energy collector according to claim 28 and in which the rear surface of the prisms is substantially vertical, the included angles of the prisms lie within the range of from about 27° to about 36°, and the refractive indicies lie within the range from about 1.50 to about 1.58.

31. A solar energy collector according to claim 28 and in which said collector comprises a reflective rear wall spaced from said front wall for reflecting rays from said front wall to said absorption region.

32. A solar energy collector according to claim 31 and in which said rear wall has a lower portion substantially parallel to said front wall and an upper portion which converges with said front wall.

33. A solar energy collector according to claim 28 and in which said collector has a lower portion for reflecting rays upwardly to an absorber.

* * * * *